Patented Jan. 30, 1934

1,944,880

UNITED STATES PATENT OFFICE 1,944,880

METHOD OF PRODUCING FLOUR

Jacob Finkel, Philadelphia, Pa.

No Drawing. Application March 20, 1930
Serial No. 437,612

3 Claims. (Cl. 99—11)

The present invention relates to improvements in food compositions for making flour.

The prepared flour that is now sold in packages in a dry form and which mixture has water added hereto to convert the same into a dough for baking cakes, bread and the like, may work satisfactorily at times, but experience has proven that during hot weather, the prepared mixture is subject to quick deterioration.

Furthermore, where a bone-dry powder for making cake dough is produced where the moisture is driven off of the ingredients at a high temperature, a scorching effect on some of the mass results and this causes an irregular grain in the baked or fried product and this is due to the hardening of the flour glutens.

It is, therefore, one of the important objects of the present invention to produce a flour mixture that will be free of all of the above objections and which will produce an article that can be readily and easily digested, the condition of the prepared flour remaining the same, regardless of climatic or seasonal conditions.

A further and important object is to produce a flour which will need nothing but the application of water to convert it into a cake-dough, thus enabling any inexperienced person to bake cakes, bread and the like by simply following the directions outlined on the package containing the prepared flour.

A further and salient object of the invention resides in the provision of a method of the above mentioned character wherein the ingredients constituting the mixture will be subjected to a blending action under a low temperature.

In carrying out my method of producing the flour mixture that is used for baking purposes, a suitable quantity of flour, whether soft winter or hard flour or proportionate blending of different kinds of flour including corn starch, tapioca or rice flour, depending upon the desired finished product, is placed within a vacuum rotary dryer of any conventional construction and within which a rotary agitator operates to thoroughly stir the contents and to cause the vapor of the flour to be driven off. A vacuum pump may be employed to draw off the vapors evolved. The vapors that are drawn off pass through a filter and through a condenser or other cooling medium.

When the desired amount of moisture has been removed from the flour in the drier, the vacuum pump is cut off. I then add to the flour in the drier, sweetening, shortening, coloring, flavoring, eggs, milk and any other ingredients with the exception of leavening agents.

The mixture is then thoroughly agitated in the vacuum drier, simultaneously causing a blending action to take place due to the vaporization of the ingredients in the drier and a unified mass is produced.

I wish to state at this juncture of the process or method, that the blending action of the ingredients in the vacuum drier takes place under low temperature (140° Fahrenheit).

The chief aim in blending in the shortening to combine with the flour glutens is to produce softening of the flour glutens, thus increasing the preservative qualities of the flour mixture. When the flour glutens are softened under the aforementioned temperature, they have an affinity of absorbing the shortening. Experiments have shown that where high temperatures are used, anywhere from 185 degrees Fahrenheit up, the flour glutens are dried up and become hardened, thus causing the same to have an affinity of absorbing moisture too rapidly, which accounts for quick deterioration of the product.

By treating the ingredients in the above manner and at the temperature of approximately 140 degrees Fahrenheit, the same are properly cooked to assure uniformity of the product and materially adding to the palatability and digestibility qualities of the finished product.

The treatment of the mixture at a low temperature is necessary in order to prevent scorching of the mass which would result where the mixture is subjected to a high temperature treatment. After the entire mass of the drier has been thoroughly blended together, the contents are removed from the drier and cooled in any suitable manner sufficiently to enable the addition of leavening agents.

Subsequent to the addition of the leavening agent to the blended mass, the mixture which is in the form of a bone-dry powder is packed in moisture proof cartons to protect the same from exposure to moisture. The prepared flour is then ready for use and merely by the addition of water, a dough will be produced which when baked will produce a food product of superior value. If desired, the coloring ingredients used may be added at the time the leavening agents are added rather than at the time the sweetening, shortening and other ingredients are added to the flour from which the vapors have been removed.

By the use of my method, a healthy and readily digestible product will be produced and furthermore, when the prepared flour is properly packed, the same can be kept in perfect condition regardless of climatic conditions. Also my method can be carried out at a very low cost and will also produce a very inexpensive food mixture.

Having thus described my invention, what is claimed is:

1. The method of preparing a food mixture in the form of a bone-dry powder for making cake dough, comprising agitating and heating a mass of grain flour under a vacuum for removing the moisture from the flour, then adding shortening and other perishable ingredients to the dried flour and continuing the heating and agitation of the mass at a temperature substantially below 185 degrees Fahrenheit for a time sufficient to drive off substantially all free moisture, whereby to produce softening of the flour glutens and blending of the shortening therewith to thereby increase the preservative qualities of the flour mixture.

2. The method of preparing a food mixture in the form of a bone-dry powder for making cake dough, comprising agitating and heating a mass of grain flour under a vacuum for removing the moisture from the flour, then adding shortening and other perishable ingredients to the dried flour and continuing the heating and agitation of the mass at a temperature substantially below 185 degrees Fahrenheit for a time sufficient to drive off substantially all free moisture, whereby to produce softening of the flour glutens and blending of the shortening therewith to thereby increase the preservative qualities of the flour mixture, then cooling the mass and subsequently adding a leavening agent to the cooled mixture.

3. The method of preparing a food mixture in the form of a bone-dry powder for making cake dough, comprising agitating and heating a mass of grain flour under a vacuum for removing the moisture from the flour, then adding shortening and other perishable ingredients to the dried flour and continuing the heating and agitation of the mass at a temperature approximately 140 degrees Fahrenheit for a time sufficient to drive off substantially all free moisture, whereby to produce softening of the flour glutens and blending of the shortening therewith to thereby increase the preservative qualities of the flour mixture.

JACOB FINKEL.